United States Patent
Shukla et al.

(10) Patent No.: US 7,097,888 B2
(45) Date of Patent: Aug. 29, 2006

(54) ALIGNED LIQUID CRYSTAL LAYER CONTAINING AZOLIUM SALTS AND PROCESS FOR INCREASING THE TILT

(75) Inventors: Deepak Shukla, Webster, NY (US); Thomas R. Welter, Webster, NY (US); James F. Elman, Fairport, NY (US); Samir Y. Farid, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 17 days.

(21) Appl. No.: 10/736,392

(22) Filed: Dec. 15, 2003

(65) Prior Publication Data

US 2005/0129874 A1   Jun. 16, 2005

(51) Int. Cl.
*C09K 19/58* (2006.01)
*C09K 19/56* (2006.01)

(52) U.S. Cl. .................. 428/1.3; 428/1.1; 428/1.2; 252/299.01; 252/299.2; 252/299.4; 349/117

(58) Field of Classification Search ........... 252/299.01, 252/299.2, 299.5, 299.4; 428/1.1, 1.2, 1.3
See application file for complete search history.

(56) References Cited

U.S. PATENT DOCUMENTS

| | | | | |
|---|---|---|---|---|
| 4,115,310 A | * | 9/1978 | Sato et al. | ............... 252/299.2 |
| 5,602,661 A | | 2/1997 | Schadt et al. | |
| 5,770,826 A | | 6/1998 | Chaudhari et al. | |
| 6,020,946 A | | 2/2000 | Callegari et al. | |
| 6,160,597 A | | 12/2000 | Schadt et al. | |
| 6,495,067 B1 | * | 12/2002 | Ono | ............... 252/299.61 |
| 2004/0169158 A1 | * | 9/2004 | Kato et al. | ............... 252/299.2 |

FOREIGN PATENT DOCUMENTS

| | | | |
|---|---|---|---|
| EP | 1033731 | * | 9/2000 |
| JP | 2002-037777 | | 2/2002 |
| JP | 2002-038158 | | 2/2002 |
| JP | 2002-062531 | | 2/2002 |
| JP | 2002-062533 | | 2/2002 |
| JP | 2002-358821 | * | 12/2002 |

| | | | |
|---|---|---|---|
| WO | 2004/022670 | | 3/2004 |

OTHER PUBLICATIONS

D. Shukla et al, "An Aligned Liquid Crystal Layer Containing Onium Salts and Process for Increasing the Tilt", USSN 10/736,342 , (D-84415) filed Dec. 15, 2003.
D. Shukla et al., "An Aligned Liquid Crystal Layer Containing Azolium Salts and Process for Increasing the Tilt", USSN 10/736,134 , (D-84398) filed Dec. 15, 2003.
M. Funahashi et al., Photoconductive Behavior in Smectic A Phase of 2-(4'-Heptyloxyphenyl)-6-Dodecylthiobenzothiazole, Japanese Journal of Applied Physics, vol. 35, Jun. 1, 1996, pp. L703-L705.

* cited by examiner

*Primary Examiner*—Shean C Wu
(74) *Attorney, Agent, or Firm*—Arthur E. Kluegel

(57) ABSTRACT

Disclosed is a multilayer film comprising a substrate bearing an aligned liquid crystal layer wherein the aligned liquid crystal layer contains an azolium salt represented by formula (I):

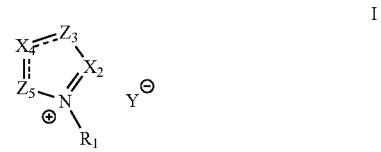

wherein the subscripts represent the ring positions and each X is independently N or C—R;

each Z is independently N, N—R, C—(R)(R), O, S, $SO_2$, SO, C=O, C=S, or C=NR;

each R group is independently hydrogen or a substituent; and

Y is a charge balancing anion, which may be a separate moiety or part of an X, Z, or R;

provided two or more X, Z and R groups may form a ring; provided the salt may be part of an oligomer or polymer.
Such a film provides a predetermined increase in pre-tilt angle for use in liquid crystal devices.

27 Claims, 1 Drawing Sheet

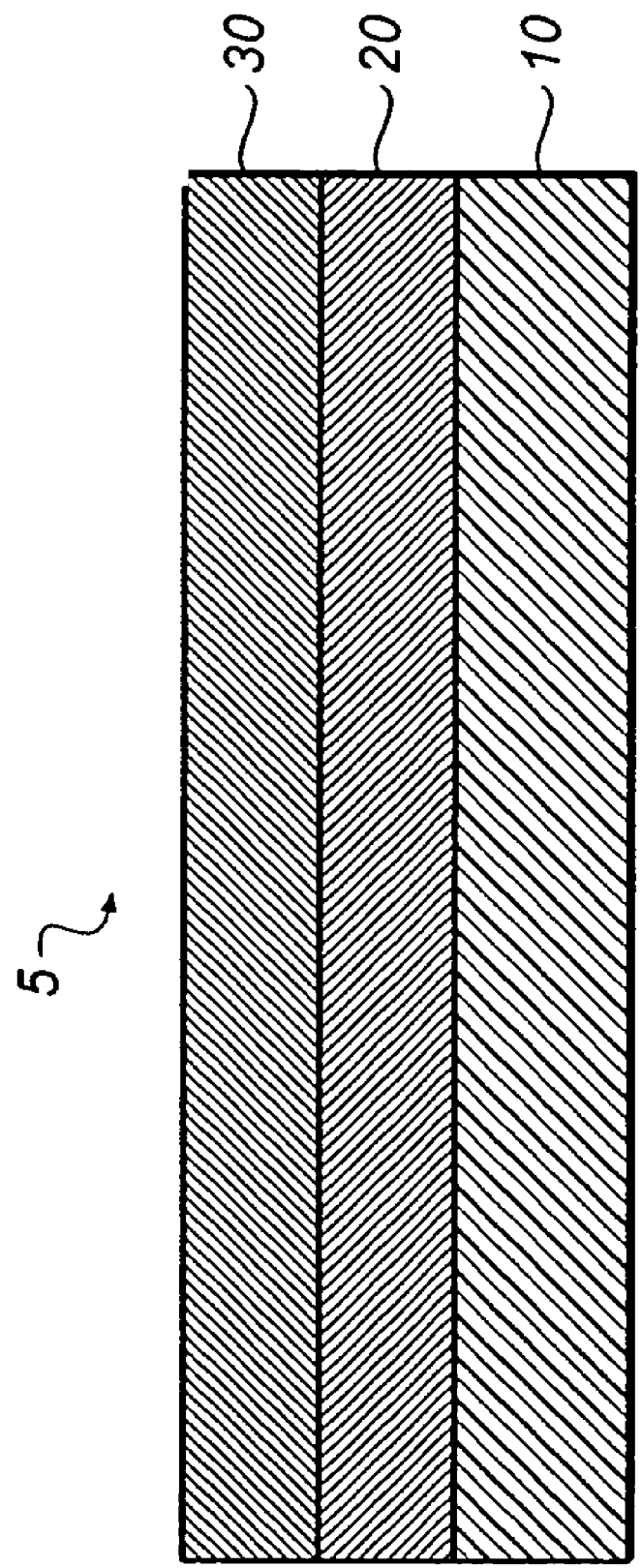

ALIGNED LIQUID CRYSTAL LAYER CONTAINING AZOLIUM SALTS AND PROCESS FOR INCREASING THE TILT

FIELD OF THE INVENTION

This invention relates to a method for controlled increase of tilt angle of liquid crystal molecules by azolium salts and to an aligned layer of liquid crystal molecules on a substrate having an orientation layer and a liquid crystal layer containing azolium salt effective to increase the tilt angle of liquid crystal molecules.

BACKGROUND OF THE INVENTION

The vast majority of liquid crystal displays (LCD) require uniform liquid crystal (LC) molecular orientation, usually with a small angle between the LC director n and substrate; this angle is called the "pretilt" angle. A number of methods have been used to achieve tilted alignment of LCs. These are described in detail in *Fundamentals and Applications of Liquid Crystals*, published by Industrial Survey Association (1991). The most common technique to achieve oblique alignment involves deposition of a thin polymer layer on the substrate, which is subsequently rubbed. Rubbing of the polymer determines the azimuthal orientation of the LC molecular alignment, and induces a non-zero pretilt angle. Polyimide (PI) films are commonly used for rubbing alignment of LC's because of their outstanding thermal stability, low dielectric constant, excellent chemical resistance and high productivity. Furthermore, LC alignment on rubbed PI film generally provides a stable pretilt angle preventing reverse tilt disclination of LC molecules with applied voltage. However, the pretilt angle depends on the properties of the orientation film itself. Thus to satisfy specific pretilt angle requirements for various LCD modes, specific polyimides have been made for controlling the pretilt angle. For example, polyimides with long alkyl and fluorinated alkyl side groups have been used to generate high LC pretilt angles. It has been suggested that steric interaction between LC molecules and branched long alkyl side chains is a possible cause for high pretilt angles.

The rubbing method suffers from several drawbacks, however, especially accumulation of static charges at the thin film transistor sites and generation of dust particles. Recently, new non-rubbing alignment techniques, based on photo-induced anisotropy of the polymerizable orienting layers, have been introduced. Typically the photosensitive polymer films are illuminated by polarized ultraviolet light, and the azimuthal orientation of the resulting planar alignment depends on the specifics of the photo-induced reaction. In contrast to the rubbing technique, neither excess charge nor dust is created on the substrates, yet control is maintained over both the tilt angle and the anchoring strength. The traditional rubbing technique establishes a unique direction of the tilted easy axis; this direction is determined by the direction of rubbing. On the other hand, for photoalignment there is a twofold degeneracy of the light-induced easy axis. This twofold degeneracy causes poor reproducibility of the pretilt angle and, more importantly, the appearance of defects at the resulting boundaries between orientation domains. This degeneracy may be partially removed during the filling of the LC cell because of the effect of flow alignment, but the resulting alignment is not temporally stable. To date, the most promising method to break this degeneracy involves oblique irradiation of the photoalignment layer. Oblique polarized irradiation makes an angle with the surface and the photoreaction for on-axis transition moments is much easier than that of off-axis ones. Consequently the tilt degeneracy is broken and the liquid crystals tilt in a preferred direction. Such an irradiation scheme requires specialized equipment and have proven difficult to implement in a large scale process.

Other non-contact methods for aligning LC molecules include a stretched polymer, a Langinuir Blodgett film, a grating structure produced by microlithography, oblique angle deposition of silicon oxide, and ion beam irradiation of a polyimide surface as in U.S. Pat. No. 5,770,826. The method places the LC's on a polyimide surface which has been bombarded with low energy (about 100 eV) $Ar^+$ ions. This method has been extended to include diamond-like carbon (DLC), amorphous hydrogenated silicon, SiC, $SiO_2$, glass, $Si_3N_4$, $Al_2O_3$, $CeO_2$, $SnO_2$, and $ZnTiO_2$ films as described in U.S. Pat. No. 6,020,946.

JP 2002038158 discloses a method for the formation of a liquid crystal layer containing liquid crystal molecules on a substrate and the orientation of the liquid crystal molecules. A pyridinium quaternary salt is added to the liquid crystal layer or a layer adjacent to it, and the inclination angle of the liquid crystal molecules is controlled by the action of the pyridinium quaternary salt. Although this invention provides an advantage in controlling the tilt angle of liquid crystal over other existing methods, it only provides a limited class of molecules that are capable of increasing the tilt; thus, further new materials for inducing LC pretilt are needed.

In all the methods of LC alignment described above, control of LC pretilt angle requires the use of a specific combination of the LC molecules and the alignment polymer or specific materials. Developing and optimizing such combination (of alignment polymers and LC's) is a difficult and time-consuming process. There is a need for alternative ways to control the pretilt angle of liquid crystal to the desired predetermined angle in an easy manner.

SUMMARY OF THE INVENTION

The invention provides a multilayer film comprising a substrate bearing an aligned liquid crystal layer wherein the aligned liquid crystal layer contains an azolium salt represented by formula (I):

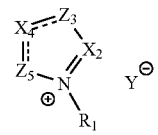

wherein the subscripts represent the ring positions and each X is independently N or C—R;

each Z is independently N, N—R, C—(R)(R), O, S, $SO_2$, SO, C=O, C=S, or C=NR;

each R group is independently hydrogen or a substituent; and

Y is a charge balancing anion, which may be a separate moiety or part of an X, Z, or R;

provided two or more X, Z and R groups may form a ring;

provided the salt may be part of an oligomer or polymer.

Such a film provides a predetermined pre-tilt angle for use in liquid crystal devices. The invention also includes a process for forming a film with a predetermined in pretilt angle through the incorporation of the azolium compound in controlled amounts.

BRIEF DESCRIPTION OF THE DRAWING

FIG. 1 is a cross-sectional schematic of a multilayer of the invention.

DETAILED DESCRIPTION OF THE INVENTION

The present invention provides a method for controlled tilt increase of oriented liquid crystal molecules by added azolium salts as summarized above. The current invention is described by referring to FIG. 1 which shows a cross-sectional schematic view of an oriented liquid crystal multilayer film 5. This structure comprises a substrate 10 of transparent material, such as glass or polymer. It should be understood that to be called a substrate, it must be solid and mechanically strong so that it can stand alone and support other layers. The substrate can be flexible or rigid. A typical substrate is made of triacetate cellulose (TAC), polyester, polycarbonate, polysulfone, polyethersulfone, or other transparent polymers, and has a thickness of 25 to 500 micrometers. Substrate 10 typically has low in-plane retardation, preferably less than 10 nm, and more preferably less than 5 nm. In some other cases, the substrate 10 may have larger in-plane retardation (some short discussion of the relevance of retardation might be useful here or in the introduction) between 15 to 150 nm. Typically, when the substrate 10 is made of triacetyl cellulose, it has out-of-plane retardation around −40 nm to −120 nm. This is a desired property when the compensator is designed to compensate a liquid crystal state with an ON voltage applied. The in-plane retardation discussed above is defined as the absolute value of $(n_x-n_y)d$ and the out-of-plane retardation discussed above is defined as $[(n_x+n_y/2)-n_z]d$, respectively. The refractive indices $n_x$ and $n_y$ are along the slow and fast axes in plane of the substrate 10, respectively, $n_z$ is the refractive index along the substrate thickness direction (Z-axis), and d is the substrate 10 thickness. The substrate is preferably in the form of a continuous (rolled) film or web. Glass plates, ITO substrates, color filter substrates, quartz plates, silicon wafers, can also be used as substrates.

The substrate 10 can be used alone or as a pair. In the case of usage as a pair, if necessary, a spacer, a sealing agent or the like can also be used. In this invention, it is preferable that the layer adjacent to the liquid crystal layer is the layer nearest the liquid crystal layer 30 among the layers located between the substrate and the liquid crystal layer 30. It is also acceptable that the layer adjacent to the liquid crystal layer 30 functions as an orientation film or a transparent electrode.

On the substrate 10, an orientation layer 20 is applied, and a liquid crystal layer 30 is disposed on top of layer 20. The orientation layer 20 can be oriented by various techniques. In one example, the orientation layer contains a rubbing-orientable material such as a polyimide or polyvinyl alcohol and can be oriented by a rubbing technique. In another example, the orientation layer 20 contains a shear-orientable material and can be oriented by a shear-alignment technique. In another example, the orientation layer 20 contains an electrically- or magnetically-orientable material and can be oriented by an electrical- or magnetic-alignment technique. In another example, the orientation layer can also be a layer of SiOx fabricated by oblique deposition. In another example, the orientation layer 20 contains a photo-orientable material and can be oriented by a photo-alignment technique. Photo-orientable materials include, for example, photo isomerization polymers, photo-dimerization polymers, and photo-decomposition polymers. In a preferred embodiment, the photo-orientable materials are cinnamic acid derivatives as disclosed in U.S. Pat. No. 6,160,597. Such materials may be oriented and simultaneously cross-linked by selective irradiation with linear polarized UV light.

Mainly liquid crystal molecules constitute the liquid crystal layer 30. As the liquid crystal molecules, discotic liquid crystal molecules, rod-shaped (nematic) liquid crystal molecules, and cholesteric liquid crystal molecules can be used. Nematic liquid crystal molecules are especially preferred. Two or more types of liquid crystal molecules can also be used in combination. Components (such as a colorant, a dopant for tilt angle increase, dichroic colorant, polymer, polymerizing agent, sensitizing agent, phase transition temperature depressant, and stabilizer) can also be added to the liquid crystal layer in addition to the liquid crystal molecules. A variety of well established methods can be used to apply the liquid crystal layer 30 to the substrate. Accordingly, liquid crystal layer 30 can be coated on the orientation layer 20 using, the curtain coating method, extrusion coating method, roll coating method, spin coating method, dip coating method, bar coating method, spray coating method, printing coating method, and the like.

In one embodiment of the invention, the liquid crystal layer 30 is typically a nematic liquid crystalline pre-polymer when it is first disposed on the orientation layer 20, and is cross-linked by a further UV irradiation, or by other means such as heat. In a preferred embodiment, the anisotropic layer contains a material such as a diacrylate or diepoxide with positive birefringence as disclosed in U.S. Pat. No. 6,160,597 (Schadt et al.) and U.S. Pat. No. 5,602,661 (Schadt et al.). The optic axis in the anisotropic layer 30 is usually tilted relative to the layer plane, and varies across the thickness direction. The anisotropic layer 30 in accordance with the present invention is applied from a liquid medium containing an azolium salt or a mixture of azolium salts.

The azolium salt increases the tilt angle of the liquid crystal molecules in layer 30 without detrimentally affecting its adhesion to orientation layer 20.

In the present invention, the azolium salt is used for the controlled increase of the tilt angle of the liquid crystal molecules. In the scope of the invention, the azolium compound is a five-membered N-heterocyclic compound represented by general formula I

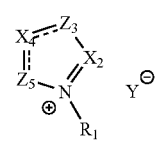

wherein the subscripts represent the ring position and each X and Z represents a carbon, nitrogen, sulfur or oxygen atom with sufficient bonds and substituents to form a heteroaromatic ring. In Formula (I): each X is independently N or C—R; each Z is independently N, N—R, C—R, O, S, $SO_2$, SO, C=O, C=S, or C=NR; each R is independently hydrogen or a substituent;

two or more X, Z and R groups may form a ring; and Y is a charge balancing anion, which may be a separate moiety or part of an X, Z, or R.

When reference in this application is made to a particular group, unless otherwise specifically stated, the group may itself be unsubstituted or substituted with one or more substituents (up to the maximum possible number). For example, "alkyl" group refers to a substituted or unsubstituted alkyl group, such as arylalkyl group or sulfoalkyl group while "aryl" group refers to a substituted or unsubstituted aryl group (with up to six substituents) such as alkaryl or sulfoaryl group. The substituent may be itself substituted or unsubstituted. Examples of substituents on any of the mentioned groups can include known substituents, such as: chloro, fluoro, bromo, iodo; hydroxy; alkoxy, particularly those "lower alkyl" (that is, with 1 to 12 carbon atoms, for example, methoxy, ethoxy; substituted or unsubstituted alkyl, particularly lower alkyl (for example, methyl, trifluoromethyl); thioalkyl (for example, methylthio or ethylthio), particularly either of those with 1 to 12 carbon atoms; substituted or unsubstituted alkenyl, preferably of 2 to 12 carbon atoms (for example, ethenyl, propenyl, or butenyl); substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O, or S (for example, pyridyl, thienyl, furyl, pyrrolyl); acid or acid salt groups; such groups as hydroxyl, amino, alkylamino, cyano, nitro, carboxy, carboxylate, acyl, alkoxycarbonyl, aminocarbonyl, sulfonamido, sulfamoyl, sulfo, sulfonate, or alkylammonium; and other groups known in the art. Alkyl substituents may specifically include "lower alkyl" (that is, having 1–12 carbon atoms), for example, methyl, ethyl, and the like. Further, with regard to any alkyl group or alkylene group, it will be understood that these can be branched or unbranched and include ring structures.

In a useful embodiment, the azolium salts in the present invention are represented by formula (II)

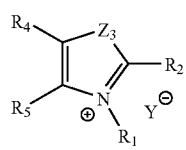

II wherein the subscripts in II represent the ring position and Z represents a carbon, nitrogen, sulfur or oxygen atom with sufficient bonds and substituents to form a heteroaromatic ring and each R independently represents a hydrogen or a substituent. Specifically Z is N—R, O, S, SO$_2$, SO, C=O, C=S, or C=NR; each R is independently hydrogen or a substituent; any two or more R substituents may form a ring; and Y is a charge balancing anion, which may be a separate moiety or part of an R.

In another useful embodiment, the azolium salt is a benzazolium represented by formula (III):

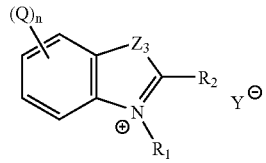

III wherein
the subscripts represent the ring positions;
Z$_3$ is N, N—R, C—(R)(R), O, S, SO$_2$, SO, C=O, C=S, or C=NR;
each R group is independently hydrogen or a substituent; and
Y is a charge balancing anion, which may be a separate moiety or part of the azolium; and
each Q independently represents a substituent and n is an integer from 0 to 4.

Illustrative examples of useful N-azolium compounds are shown by the formulae below:

I-1 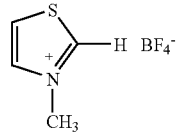

I-2 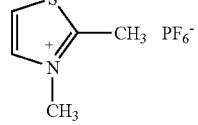

I-3 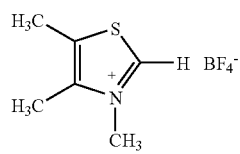

I-4 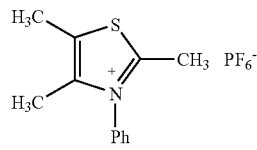

I-5 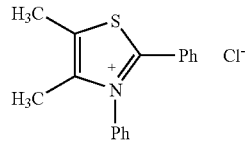

I-6 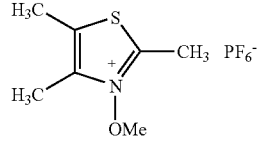

-continued
I-7 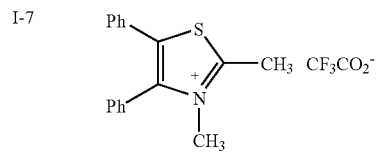
I-8 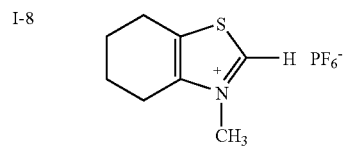
I-9 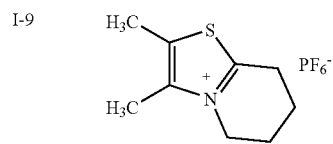
I-10 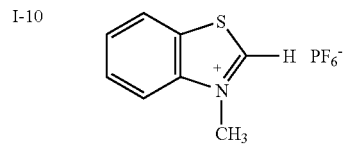
I-11 
I-12 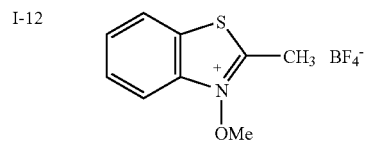
I-13 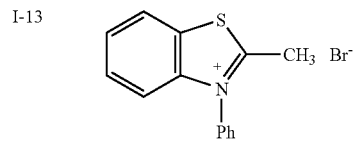
I-14 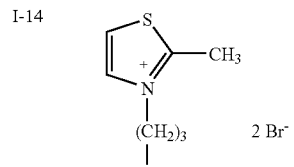
-continued
I-15 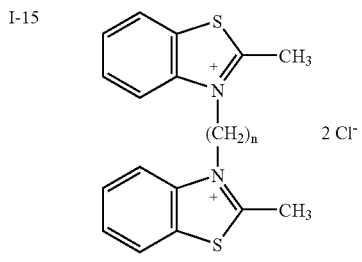
n = 1–12
I-16 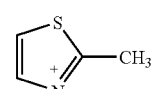
I-17 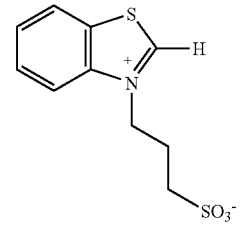
I-18 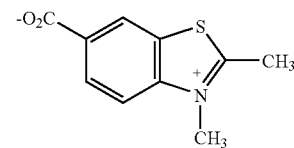
I-19 
I-20 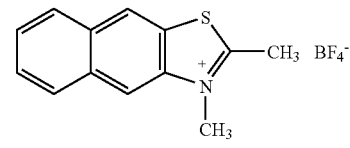
I-21 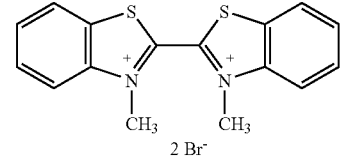
I-22 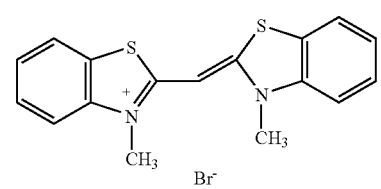

-continued
I-23 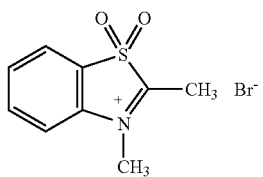
I-24 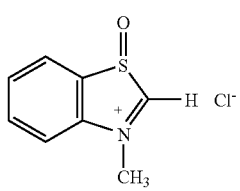
I-25 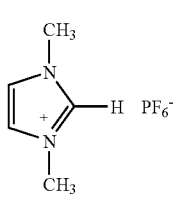
I-26 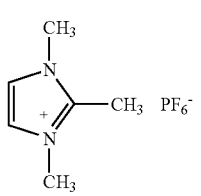
I-27 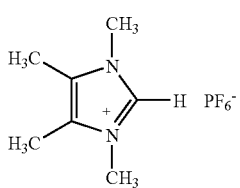
I-28 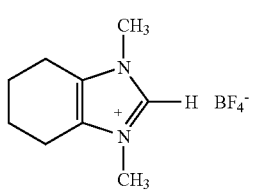
I-29 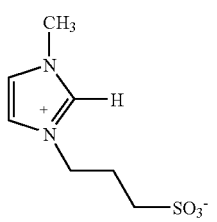
I-30 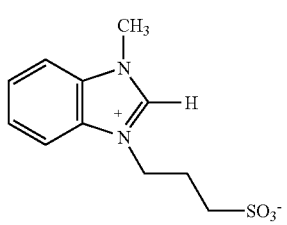
-continued
I-31 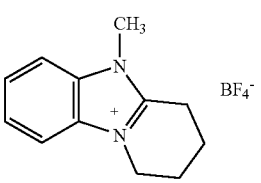
I-32 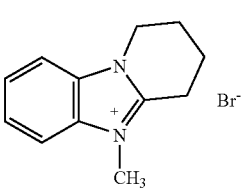
I-33 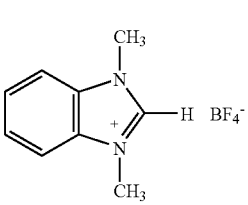
I-34 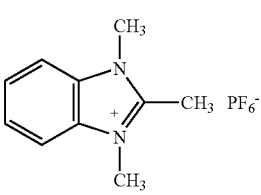
I-35 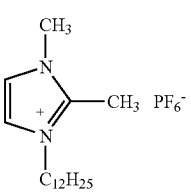
I-36 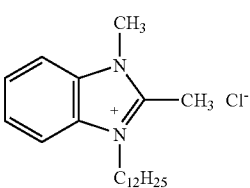
I-37 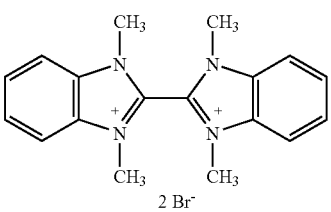
I-38 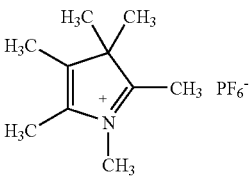

-continued
I-39 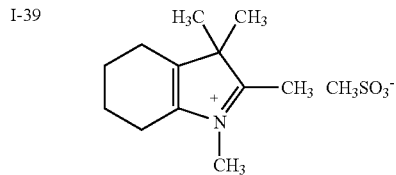
I-40 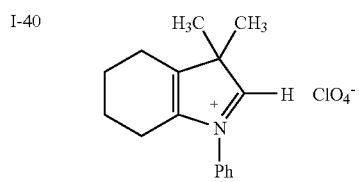
I-41 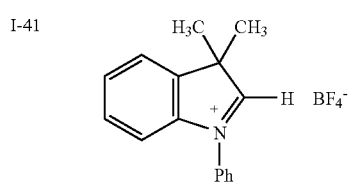
I-42 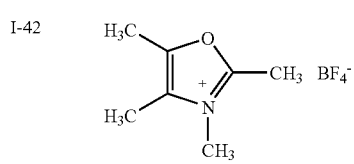
I-43 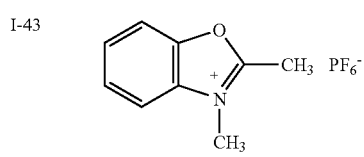
I-44 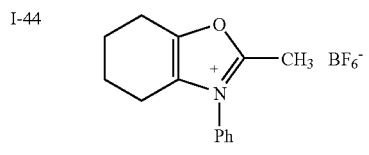
I-45 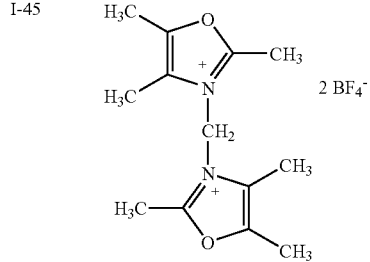
I-46 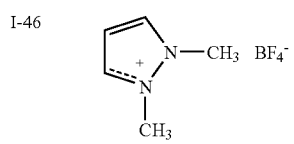
-continued
I-47 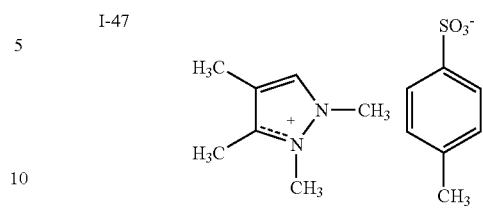
I-48 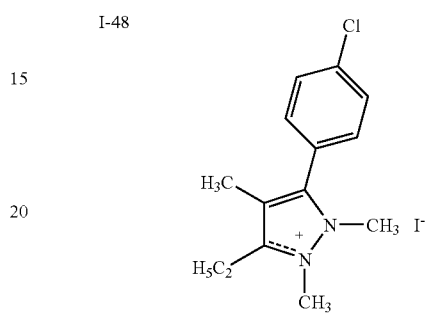
I-49 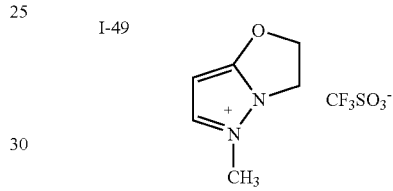
I-50 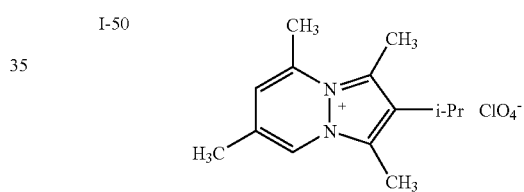
I-51 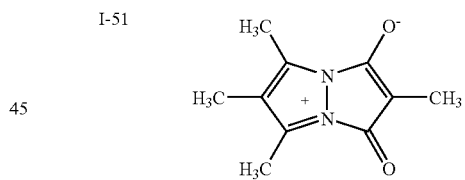
I-52 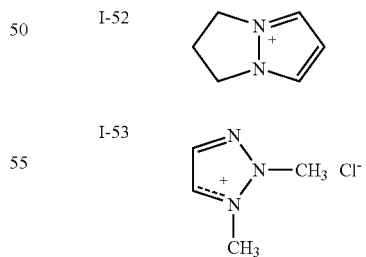
I-53 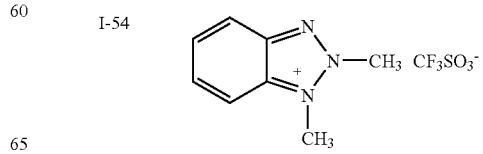
I-54

-continued

I-55
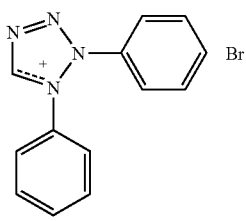

I-56
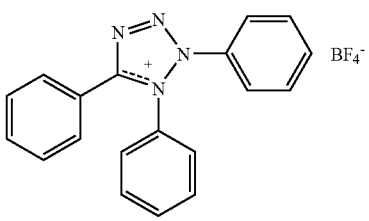

I-57
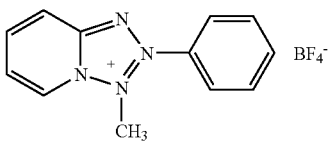

I-58
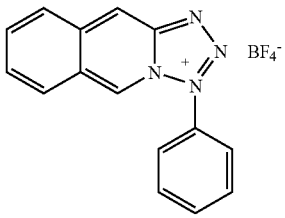

Useful azolium compounds can also be represented by the formula:

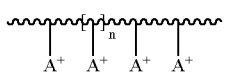

wherein $A^+$ is the azolium moiety pedant to an linking chain. This linking chain may be an alkyl group or other organic chain. Further, said chain can have additional substituents, e.g., ether, ester, amide, etc. Also, the integer n can vary from 0 to 25.

In general azolium salts are soluble in the coating solvent and addition of these salts to liquid crystal layer 30 does not change the refractive index of the liquid crystal layer 30 by more than about ±10 percent. More preferably such azolium salts will not change the refractive index the liquid crystal layer 30 by more than about ±5 percent. Most preferably such refractive index will not change the refractive index of the liquid crystal layer 30 by more than about ±2 percent. In addition, such azolium salts will increase the average tilt of liquid crystal layer 30 by more than about 1%. Preferably such azolium salts will increase the average tilt of liquid crystal layer 30 by more than about 10%. More preferably such azolium salts will increase the average tilt of the liquid crystal layer 30 by more than about 50%. Most preferably such azolium salts will increase the average tilt of the liquid crystal layer 30 by more than about 95% compared to the angle obtained without their presence.

The azolium salt can be added into a coating solution of liquid crystal layer 30. The azolium salt is added in an amount appropriate to attain the desired tilt angle increase of liquid crystal molecules without disturbing the orientation of the liquid crystal layer 30. The azolium salt is generally added in an amount of 0.1 to 10 wt % conveniently 0.25 to 5.0 wt % and usually in the range of 0.25 to 1.5 wt % of the anisotropic layer 30. The amount of the azolium salt added is dependent on both the composition of the liquid crystal layer 30 and the tilt increase desired since both of these can have an impact.

The anisotropic layer may also contain addenda such as surfactants, light stabilizers and UV initiators. UV initiatiors include materials such as benzophenone and acetophenone and their derivatives; benzoin, benzoin ethers, benzil, benzil ketals, fluorenone, xanthanone, alpha and beta naphthyl carbonyl compounds and ketones. Preferred initiators are alpha-hydroxyketones.

The present invention is illustrated in more detail by the following non-limiting examples.

In examples described below in-plane retardation was measured to assess the quality of liquid crystal alignment. For samples with tilt angles near zero, the measured (effective) birefringence of the LC layer should be between 0.12–0.13. However, as tilt angle increases, the effective birefringence decreases. For a series of examples of approximately the same layer thickness, this should result in decreasing in plane retardation with increasing tilt angle. This is exactly what is seen for these examples, confirming good alignment for all examples.

EXAMPLE 1

Comparison

This example demonstrates the photo-alignment of liquid crystal molecules on a photo-aligned layer on a glass substrate.

On a clean glass plate, a coating solution containing a mixture of VANTICO Staralign™ 2110 and Staralign™ 2100 photo-aligning vinyl cinnamate polymers (in 30:70 wt % ratio; 1 wt % total solids in methyl ethyl ketone) was spun cast (@ 700–1000 rpm). The sample was dried at 55° C. for 5 min. and then exposed to 308 nm polarized light (15–30 mJ/cm$^2$) at an inclination of 20 degrees away from normal angle of incidence to obtain a photo-aligned orientation layer. Typically this produced a 30–100 nm thick layer as measured by ellipsometry (J. A. Woollam Co., Model M2000V).

On the orientation layer a solution of liquid crystal prepolymer (LCP, CB483MEK from Vantico Co, 7 wt % in methyl ethyl ketone, supplied with photoinitiator) in methyl ethyl ketone was spun cast @ 700–1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300–1000 mJ/cm$^2$) under an atmosphere of nitrogen. In-plane retardation measurement indicated that liquid crystal molecules were aligned parallel to the direction of polarized irradiation. In-plane retardation, average tilt angle, and thickness of the anisotropic layer were measured by ellipsometry (J. A. Woollam Co., Model M2000V). The measured average tilt angle method had accuracy of ±2.0 degrees.

EXAMPLE 2

Inventive

This example shows that addition of benzothiazolium hexafluorophosphate (I-10) salt to a liquid crystal layer comprising two liquid crystal molecules increases the average tilt angle.

A photo-aligned orientation layer was prepared as in Example 1. Benzothiazolium hexafluorophosphate (I-10) (0.25–1.5 wt % of dried liquid crystal layer) was added to LCP mixture CB483MEK from Vantico Co and spun cast on the orientation layer (@ 700–1000 rpm). The sample was then heated at a temperature of 55° C. for 3 minutes to orient the nematic liquid crystalline layer and remove solvent. The sample was cooled to room temperature and liquid crystal layer cross-linked by exposing to 365 nm light (300–1000 mJ/cm$^2$) under an atmosphere of nitrogen.

TABLE I

|  | Wt % of added I-10 | Layer Thickness, (nm) | In Plane Retardation nm(measured @ 550 nm) | Average Tilt Angle (±2°) |
|---|---|---|---|---|
| Comparison Example. 1 | 0 wt % | 510 | 45 | 27 |
| Inventive Example. 2 | 0.25 wt % | 508 | 44 | 29 |
|  | 0.50 wt % | 540 | 45 | 33 |
|  | 0.75 wt % | 510 | 36 | 38 |
|  | 1.2 wt % | 514 | 37 | 39 |
|  | 2.0 wt % | 526 | 35 | 40 |

The aforementioned examples in Table I clearly demonstrate that, compared to comparison Example 1, incremental addition of benzothiazolium hexafluorophoshate (I-10) to the liquid crystal layer results in controlled increase in the average tilt angle of liquid crystal molecules.

EXAMPLE 3

Inventive

This example shows that addition of 1,2,3-trimethyl-1H-benzoimidazolium hexafluorophosphate (I-34) salt to liquid crystal layer comprising two liquid crystal molecules increases the average tilt angle.

A photo-aligned orientation layer was prepared as in Example 1. 1,2,3-Trimethyl-1H-benzoimidazolium hexafluorophosphate (I-34) (0.25–1.0 wt % of dried liquid crystal layer) was added to LCP mixture CB483MEK from Vantico Co and spun cast on the orientation layer (@ 700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE II

|  | Wt % of added I-34 | Layer Thickness, (nm) | In Plane Retardation nm(measured @ 550 nm) | Average Tilt Angle (±2°) |
|---|---|---|---|---|
| Comparison Example. 1 | 0 wt % | 510 | 45 | 27 |
| Inventive Example. 3 | 0.25 wt % | 511 | 44 | 29 |
|  | 0.50 wt % | 508 | 42 | 33 |
|  | 1.00 wt % | 504 | 35 | 36 |

The aforementioned examples in Table II clearly demonstrate that compared to comparison Example 1 incremental addition of 1,2,3-Trimethyl-1H-benzoimidazolium hexafluorophosphate (I-34) to the liquid crystal layer results in controlled increase in the average tilt angle of liquid crystal molecules.

EXAMPLE 4

Inventive

This example shows that addition of 2,3-benzothiazolium hexafluorophosphate salt (I-2) salt to liquid crystal layer comprising of two liquid crystal molecule increases the average tilt angle.

A photo-aligned orientation layer was prepared as in Example 1. 2,3-Benzothiazolium hexafluorophosphate (I-2) (0.25–1.0 wt % of dried liquid crystal layer) was added to the LCP mixture CB483MEK from Vantico Co and spun cast on the orientation layer (@ 700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE III

|  | Wt % of Added I-2 | Layer Thickness, (nm) | In Plane Retardation nm(measured @ 550 nm) | Average Tilt Angle (±2°) |
|---|---|---|---|---|
| Comparison Example. 1 | 0 wt % | 505 | 46 | 23 |
| Inventive Example. 4 | 0.25 wt % | 536 | 47 | 25 |
|  | 0.50 wt % | 498 | 40 | 32 |
|  | 1.00 wt % | 524 | 39 | 34 |
|  | 1.50 wt % | 539 | 35 | 36 |

The aforementioned examples in Table III clearly demonstrate that compared to comparison Example 1 incremental addition of 2,3-dimethylthiazolium hexafluorophosphate (I-2) to liquid crystal results in controlled increase in the average tilt angle of liquid crystal molecules.

EXAMPLE 5

Comparison

This example demonstrates the photo-alignment of a single liquid crystal molecule on a glass substrate.

Liquid crystals were prepared following the general procedure described in WO2000048985(A1). A solution of a mixture of liquid crystals was made following the general procedure disclosed in WO2000048985(A1). Thus, a 7% by weight mixture of liquid crystals was made by mixing LC-1 in methyl ethyl ketone. IRGACURE™ 369 (2-Benzyl 2-dimethylamino 1-(4-morpholinophenyl) butanone-1) from Ciba-Giegy (1% by weight of LCs), TINUVIN™-123 (bis (1-octyloxy-2,2,6,-tetramethyl-4-piperidyl) sebacate) (1% by weight of LCs), and 2,6-di-tert-butyl-p-cresol (2% by weight of LCs) were added to the LC solution.

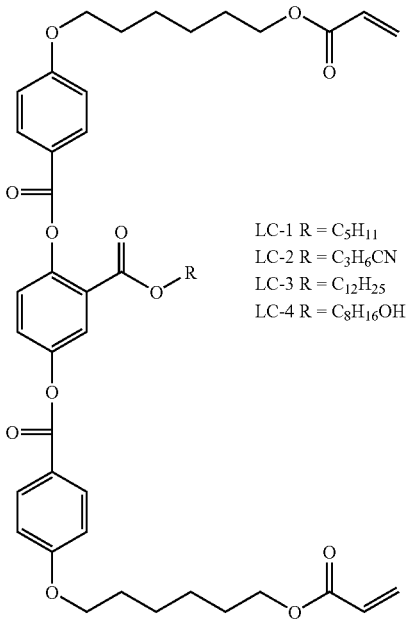

LC-1 R = $C_5H_{11}$
LC-2 R = $C_3H_6CN$
LC-3 R = $C_{12}H_{25}$
LC-4 R = $C_8H_{16}OH$

On a clean glass plate, a coating solution containing a mixture of VANTICO Staralign™ 2110 and Staralign™ 2100 photo-aligning vinyl cinnamate polymers (in 30:70 wt % ratio; 1 wt % total solids in methyl ethyl ketone) was spun cast (@ 700–1000 rpm). The sample was dried at 55° C. for 5 min. and then exposed to 308 nm polarized light (15–30 mJ/cm$^2$) at an inclination of 20 degrees away from normal angle of incidence to obtain a photo-aligned orientation layer.

On the orientation layer a solution of LC-3 prepared above in methyl ethyl ketone was spun cast @ 700–1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300–1000 mJ/cm$^2$) under an atmosphere of nitrogen. In-plane retardation measurement indicated that liquid crystal molecules were aligned parallel to the direction of polarized irradiation. In-plane retardation, average tilt angle, and thickness of the anisotropic layer were measured by ellipsometry (J. A. Woollam Co., Model M2000V). The measured average tilt angle method had accuracy of ±2.0 degrees.

EXAMPLE 6

Inventive

This example shows addition of benzothiazolium hexafluorophosphate salt (I-10) salt to liquid crystal layer comprising one liquid crystal molecule increases the average tilt angle.

A photo-aligned orientation layer was prepared as in Example 5. Benzothiazolium hexafluorophosphate (I-10) (0.25–1.5 wt % of dried liquid crystal layer) was added to the methyl ethyl ketone solution of crosslinkable diacrylate nematic liquid crystal solution (prepared above) and spun cast on the orientation layer (@ 700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE IV

| | Wt % of Added I-10 | Layer Thickness, (nm) | In Plane Retardation nm(measured @ 550 nm) | Average Tilt Angle (±2°) |
|---|---|---|---|---|
| Comparison Example. 5 | | 449 | 53 | 8 |
| Inventive Example. 6 | 0.25 wt % | 444 | 49 | 11 |
| | 0.50 wt % | 478 | 50 | 15 |
| | 0.75 wt % | 478 | 48 | 17 |

The aforementioned examples in Table IV clearly demonstrate that compared to comparison Example 5 incremental addition of benzothiazolium hexafluorophoshate (I-10) to liquid crystal layer results in controlled increase in the average tilt angle of a single liquid crystal molecule LC-1.

EXAMPLE 7

Comparison

This example demonstrates the photo-alignment of a liquid crystal molecule LC-3 on a glass substrate.

A solution of LC-3 was prepared by mixing LC-3 (7 wt %), 1% by weight of IRGACURE™ 369 from Ciba-Giegy, 1% by weight of TINUVIN™-123, and 2% by weight of 2,6-di-tert-butyl-p-cresol in methyl ethyl ketone.

A photo-aligned orientation layer was prepared as in Example 5. On the orientation layer a solution of LC-3 prepared above in methyl ethyl ketone was spun cast @ 700–1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300–1000 mJ/cm$^2$) under an atmosphere of nitrogen. In-plane retardation measurement indicated that liquid crystal molecules were aligned parallel to the direction of polarized irradiation. In-plane retardation, average tilt angle, and thickness of the anisotropic layer were measured by ellipsometry (J. A. Woollam Co., Model M2000V). The measured average tilt angle method had accuracy of ±2.0 degrees.

EXAMPLE 8

Inventive

This example shows addition of benzothiazolium hexafluorophosphate salt (I-10) salt to liquid crystal layer comprising of one liquid crystal molecule LC-3 increases its average tilt angle.

A photo-aligned orientation layer was prepared as in Example 5. Benzothiazolium hexafluorophosphate (I-10) (0.5 wt % of dried liquid crystal layer) was added to the methyl ethyl ketone solution of crosslinkable diacrylate nematic liquid crystall solution of LC-3 (prepared above) and spun cast on the orientation layer (@ 700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE V

| | Wt % of Added I-10 | Layer Thickness, (nm) | In Plane Retardation nm (measured @ 550 nm) | Average Tilt Angle (±2°) |
|---|---|---|---|---|
| Comparison Example. 7 | 0 wt % | 435 | 38 | 2 |
| Inventive Example. 8 | 0.50 wt % | 433 | 34 | 6 |

The aforementioned examples in Table V clearly demonstrate that compared to comparison Example 7 addition of benzothiazolium hexafluorophoshate (I-10) to liquid crystal layer results in increase in the average tilt angle of a single liquid crystal molecule LC-3.

EXAMPLE 9

Comparison

This example demonstrates the photo-alignment of a liquid crystal molecule LC-4 on a glass substrate.

A solution of liquid crystal in methyl ethyl ketone. was prepared by mixing LC-4 (7 wt %), 1% by weight of IRGACURE™ 369 from Ciba-Giegy, 1% by weight of TINUVIN™-123, and 2% by weight of 2,6-di-tert-butyl-p-cresol were dissolved in methyl ethyl ketone.

A photo-aligned orientation layer was prepared as in Example 5. On the orientation layer a solution of LC-4 prepared above in methyl ethyl ketone was spun cast @ 700–1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300–1000 mJ/cm$^2$) under an atmosphere of nitrogen. In-plane retardation measurement indicated that liquid crystal molecules were aligned parallel to the direction of polarized irradiation. In-plane retardation, average tilt angle, and thickness of the anisotropic layer were measured by ellipsometry (J. A. Woollam Co., Model M2000V). The measured average tilt angle method had accuracy of ±2.0 degrees.

EXAMPLE 10

Inventive

This example shows addition of benzothiazolium hexafluorophosphate salt (I-10) salt to liquid crystal layer comprising of one liquid crystal molecule LC-4 increases its average tilt angle.

A photo-aligned orientation layer was prepared as in Example 5. Benzothiazolium hexafluorophosphate (I-10) (0.5 wt % of dried liquid crystal layer) was added to the methyl ethyl ketone solution of crosslinkable diacrylate nematic liquid crystal solution of LC-4 (prepared above) and spun cast on the orientation layer (@ 700–1000 rpm). The sample was then heated at a temperature of 55° C. for 3 minutes to orient the nematic liquid crystalline layer and remove solvent. The sample was cooled to room temperature and liquid crystal layer cross-linked by exposing to 365 nm light (300–1000 mJ/cm$^2$) under an atmosphere of nitrogen.

TABLE VI

| | Wt % of Added I-10 | Layer Thickness, (nm) | In Plane Retardation nm (measured @ 550 nm) | Average Tilt Angle (±2°) |
|---|---|---|---|---|
| Comparison Example. 9 | | 425 | 30 | 37 |
| Inventive Example. 10 | 0.50 wt % | 423 | 24 | 51 |

The aforementioned examples in Table VI clearly demonstrate that, compared to comparison Example 9, addition of benzothiazolium hexafluorophoshate (I-10) to liquid crystal layer results in an increase in the average tilt angle of a single liquid crystal molecule.

EXAMPLE 11

Comparison

This example demonstrates the alignment of a liquid crystal mixture comprising two liquid crystal molecules on a rubbed poly(vinylalcohol) (PVA) alignment layer.

An aqueous solution of poly(vinylalcohol) (PVA) (0.5% by weight) was spun cast (@ 700–1000 rpm) on a glass substrate. Sample was dried at 120° C. for 2 hours and then subjected to a rubbing treatment.

On the rubbed orientation layer a solution of liquid crystal prepolymer (LCP, CB483MEK from Vantico Co, 7 wt % in methyl ethyl ketone, supplied with photoinitiator) in methyl ethyl ketone was spun cast @ 700–1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300–1000 mJ/cm$^2$) under an atmosphere of nitrogen. In-plane retardation measurement indicated that liquid crystal molecules were aligned parallel to the direction polarized irradiation.

EXAMPLE 12

Inventive

This example demonstrates addition of benzothiazolium hexafluorophosphate salt (I-10) salt to liquid crystal layer comprising of two liquid crystal molecule LC-1 and LC-2 increases its average tilt angle on a rubbed poly(vinylacohol) (PVA) alignment layer.

A rubbed orientation was prepared as in Example 11. Benzothiazolium hexafluorophosphate (I-10) (0.5 wt % of dried liquid crystal layer) was added to LCP mixture CB483MEK from Vantico Co and spun cast on the orientation layer (@ 700–1000 rpm). The sample was then heated at a temperature of 55° C. for 3 minutes to orient the nematic liquid crystalline layer and remove solvent. The sample was cooled to room temperature and liquid crystal layer cross-linked by exposing to 365 nm light (300–1000 mJ/cm$^2$) under an atmosphere of nitrogen.

TABLE VII

| | wt % of Added I-10 | Layer Thickness, (nm) | In Plane Retardation nm(measured @ 550 nm) | Average Tilt Angle (±2°) |
|---|---|---|---|---|
| Comparison Example. 11 | | 561 | 67 | 0.2 |
| Inventive Example. 12 | 0.50 wt % | 556 | 63 | 12 |

The aforementioned Example 12 in Table VII clearly demonstrate that on a rubbed PVA orientation layer compared to Comparison Example 11 addition of benzothiazolium hexafluorophoshate (I-10) to liquid crystal layer increases the average tilt angle of liquid crystal molecules.

The patents and other publications referred to herein are incorporated herein in their entirety.

PARTS LIST

| 5 | Multilayer film |
|---|---|
| 10 | Substrate |
| 20 | Orientation Layer |
| 30 | Liquid crystal layer |

What is claimed is:

1. A multilayer film comprising a substrate bearing an aligned, fixed liquid crystal layer wherein the aligned liquid crystal layer contains an azolium salt represented by formula (I):

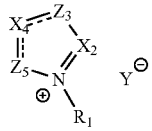

wherein
the subscripts for $X_2$ and $X_4$ and for $Z_3$ and $Z_5$ represent the ring positions with N being the "1" position, and each $X_2$ and $X_4$ is independently N or C—R;
each $Z_3$ and $Z_5$ is independently N, N—R, C—(R)(R), O, S, $SO_2$, SO, C=O, C=S, or C=NR;
each R group including $R_1$ bonded to the N at the "1" position is independently hydrogen or a substituent; and
Y is a charge balancing anion, which may be a separate moiety or part of $X_2$, $Z_3$, $X_4$, $Z_5$, or $R_1$;
provided two or more $X_2$, $Z_3$, $X_4$, $Z_5$, or $R_1$ groups optionally form a phenyl, naphthyl, pyrizinyl, pyridyl, quinolinyl, cyclohexenyl, oxazolyl, or pyrazolyl ring;
provided the salt may be part of an oligomer or polymer.

2. The film of claim 1 wherein each $X_2$ and $X_4$ is C—R.
3. The film of claim 1 wherein $Z_3$ is S or N—R.
4. The film of claim 2 wherein $Z_3$ is S or N—R.
5. The film of claim 2 wherein $Z_3$ is S.
6. The film of claim 2 wherein $Z_3$ is N—R.
7. The film of claim 1 wherein $X_2$ is C—$R_2$ wherein $R_2$ is H or a methyl group.
8. The film of claim 1 wherein $X_4$ and $Z_5$ join to form a ring.
9. The film of claim 1 wherein the ring is a phenyl ring.
10. The film of claim 1 wherein the ring is a cyclohexenyl ring.
11. The film of claim 1 wherein $X_4$ and $Z_5$ are both C—R groups.
12. The film of claim 11 wherein $R_4$ and $R_5$ are bonded at the 4 and 5 positions, respectively, and are selected from H, alkyl, alkoxy, or aryl groups.
13. The film of claim 1 wherein the compound of formula (I) is a bis compound joined at the 1 position.
14. The film of claim 1 wherein Y is an anion selected from the group consisting of $BF_4$, $PF_6$, $CF_3CO_2$, Br, Cl, COO, $SO_3$, and $CH_3SO_3$.
15. The film of claim 1 wherein the azolium salt is present in an amount of at least 0.1 wt % of the layer.
16. The film of claim 1 wherein the azolium salt is present in an amount of at least 0.1–10 wt % of the layer.
17. The film of claim 1 wherein the azolium salt is present in an amount of at least 0.25–5 wt % of the layer.
18. The film of claim 1 wherein the azolium salt is a benzazolium represented by formula (II):

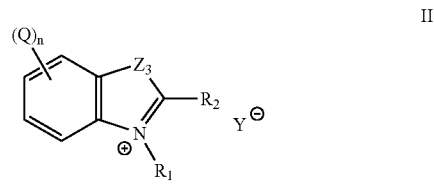

wherein
the subscripts represent the ring positions;
$Z_3$ is N, N—R, C—(R)(R), O, S, $SO_2$, SO, C=O, C=S, or C=NR;
each R group is including $R_1$ and $R_2$, is independently hydrogen or a substituent;
Y is a charge balancing anion, which may be a separate moiety or part of the azolium; and
each Q independently represents a substituent and n is an integer from 0 to 4.

19. The film of claim 18 wherein, $Z_3$ is N—R, O, or S where R is H or a substituent.
20. The film of claim 18 wherein the azolium salt is present in an amount of at least 0.1 wt % of the layer.
21. The film of claim 18 wherein the azolium salt is present in an amount of at least 0.1–10 wt % of the layer.
22. The film of claim 18 wherein the azolium salt is present in an amount of at least 0.25–5 wt % of the layer.
23. A process for imparting an increased tilt angle to a polymeric liquid crystal layer upon curing comprising including in that layer an azolium salt compound according to claim 1 prior to curing.
24. A process for imparting an increased tilt angle to a polymeric liquid crystal layer upon curing comprising including in that layer an azolium salt compound according to claim 18 prior to curing.
25. A compensator comprising the film of claim 1.
26. An optical device comprising the film of claim 1.
27. A liquid crystal display comprising the film of claim 1.

* * * * *